(12) United States Patent
Yamaguchi

(10) Patent No.: US 8,316,881 B2
(45) Date of Patent: Nov. 27, 2012

(54) FUEL TANK CHECK VALVE

(75) Inventor: Kosei Yamaguchi, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 542 days.

(21) Appl. No.: 12/585,280

(22) Filed: Sep. 10, 2009

(65) Prior Publication Data

US 2010/0126603 A1 May 27, 2010

(30) Foreign Application Priority Data

Nov. 26, 2008 (JP) ................. P2008-301510

(51) Int. Cl.
*B60K 15/04* (2006.01)
*F16L 37/098* (2006.01)

(52) U.S. Cl. .............. 137/515.5; 137/592; 285/307; 285/319

(58) Field of Classification Search ............ 137/515, 137/515.5, 592; 285/305, 307, 319, 330
See application file for complete search history.

(56) References Cited

U.S. PATENT DOCUMENTS

| | | | | |
|---|---|---|---|---|
| 1,301,565 | A * | 4/1919 | Jacobs | 285/319 |
| 4,696,497 | A * | 9/1987 | Schwarzensteiner | 285/307 |
| 4,907,663 | A * | 3/1990 | Maier | 285/307 |
| 5,660,206 | A * | 8/1997 | Neal et al. | 137/592 |
| 5,988,704 | A * | 11/1999 | Ryhman | 285/307 |
| 6,019,127 | A * | 2/2000 | Orita et al. | 137/592 |
| 6,240,957 | B1 * | 6/2001 | Hattori | 137/592 |
| 6,260,578 | B1 * | 7/2001 | Kuehnemund et al. | 137/592 |
| 6,340,031 | B1 * | 1/2002 | Matsumoto et al. | 137/592 |
| 6,394,504 | B1 * | 5/2002 | Brummans et al. | 285/319 |
| 6,675,843 | B2 * | 1/2004 | Yonezawa et al. | 137/592 |
| 7,040,669 | B2 * | 5/2006 | Kenmotsu et al. | 137/515.3 |
| 7,171,749 | B2 * | 2/2007 | Kaneko | 137/590 |
| 2002/0189711 | A1 | 12/2002 | Yonezawa et al. | |

FOREIGN PATENT DOCUMENTS

| | | |
|---|---|---|
| JP | 2001-280520 (A) | 10/2001 |
| JP | 3886344 | 12/2006 |

OTHER PUBLICATIONS

Japanese Office Action dated Aug. 31, 2012, with English-language translation.

* cited by examiner

*Primary Examiner* — John Rivell
(74) *Attorney, Agent, or Firm* — McGinn IP Law Group, PLLC

(57) ABSTRACT

According to an aspect of the present invention, there is provided a fuel tank check valve including: a main tubular body attached on a fuel filler pipe; a valve element; a first tube that is disposed between the main tubular body and the fuel filler pipe and that has a first locking portion to engage with the fuel filler pipe; an annular seal member; and a second tube that is disposed to sandwich the annular seal member with the first tube and that has a second locking portion to engage with the main tubular body, wherein the fuel filler pipe is disposed on an inner circumferential surface of the first tube, wherein the first locking portion projects in an inside diameter direction, and wherein the first locking portion engages with an engagement hole in the fuel filler pipe from an outside.

7 Claims, 4 Drawing Sheets

FUEL TANK CHECK VALVE

CROSS-REFERENCE TO RELATED APPLICATIONS

This application claims priority from Japanese Patent Application No. 2008-301510 filed on Nov. 26, 2008, the entire contents of which are incorporated herein by reference.

BACKGROUND OF THE INVENTION

1. Field of the Invention

An aspect of the present invention relates to a fuel tank check valve which is provided on a downstream of a fuel filler pipe of a fuel tank for a motor vehicle and the like.

2. Description of the Related Art

For example, a fuel filler pipe coupled to a fuel filler port is connected to a fuel tank for a motor vehicle, so that fuel is supplied into the fuel tank through the fuel filler pipe. Provided on a downstream (an outlet side) of the fuel filler pipe is a check valve which opens when fuel is supplied so as to permit flow of fuel into the fuel tank and closes when the fuel supply is completed so as to prevent reverse flow of fuel into the fuel filler pipe from the fuel tank.

There have been devised various constructions for mounting a check valve of this type on a fuel filler pipe. For example, Japanese Patent No. 3886344 discloses a fuel tank check valve including a main tubular body fitted on or in a fuel filler pipe and a valve element provided at a downstream portion of the main tubular body for permitting flow of fuel into the fuel tank and preventing flow of fuel out of the fuel tank, wherein a first tube having a first locking portion for the fuel filler pipe, an annular seal member adapted to be brought into abutment with a circumferential surface of the main tubular body and a circumferential surface of the fuel filler pipe and a second tube disposed further upstream than the first tube so as to hold the annular seal member between the first tube and itself and having a second locking portion for the main tubular body are disposed between the main tubular body and the fuel filler pipe, whereby the first locking portion of the first tube is brought into engagement with the fuel filler pipe for connection thereto upon the insertion of the fuel filler pipe. The first locking portion provided on the first tube is made up of an elastic locking arm which first projects radially inwards and then extends towards an upstream so as to hold the fuel filler pipe.

In Japanese Patent No. 3886344, the first locking portion of the first tube for the fuel filler pipe first projects radially inwards and then extends towards the upstream. When the first tube is coupled to the fuel filler pipe via the first locking portion, the first locking portion protrudes into an inside of the fuel filler pipe. As a result, a flowing resistance is increased, and fuel does not flow smoothly.

SUMMARY OF THE INVENTION

One of objects of the present invention is to provide a fuel tank check valve having the small flowing resistance and enabling fuel to smoothly flow through the fuel filler pipe.

According to a first aspect of the invention, there is provided a fuel tank check valve including: a main tubular body that is attached on a downstream end of a fuel filler pipe of a fuel tank; a valve element that is provided at a downstream portion of the main tubular body and that is configured to permit a fuel flowing into the fuel tank and prevent the fuel flowing out of the fuel tank; a first tube that is disposed between the main tubular body and the fuel filler pipe and that has a first locking portion to engage with the fuel filler pipe; an annular seal member that is disposed to be brought into abutment with an inner circumferential surface of the main tubular body and an outer circumferential surface of the fuel filler pipe; and a second tube that is disposed an upstream of the first tube so as to sandwich the annular seal member with the first tube and that has a second locking portion to engage with the main tubular body, wherein the fuel filler pipe is disposed on an inner circumferential surface of the first tube, wherein the first locking portion projects from the inner circumferential surface of the first tube in an inside diameter direction, and wherein the first locking portion is configured to engage with an engagement hole in the fuel filler pipe from an outside.

According to the first aspect of the invention, the first tube, the annular seal member and the second tube are disposed on the inner circumference of the main tubular body in advance in such a manner that the annular seal member is held between the first tube and the second tube with the second locking portion of the second tube brought into engagement with the main tubular body, whereby the annular seal member can be held to the inner circumference of the main tubular body. When the fuel filler pipe is inserted into the second tube from the upstream end of the main tubular body in that state, a distal end of the fuel filler pipe passes through the second tube, the annular seal member and the first tube to enter the check valve, and the first locking portion which projects radially inwards from the inner circumferential surface of the first tube is brought into engagement with the engagement hole in the fuel filler pipe from the outside, whereby the main tubular body can be coupled to the fuel filler pipe via the first tube, the annular seal member and the second tube. By coupling the main tubular body to the downstream end of the fuel filler pipe in the way described above, the check valve can be mounted on the downstream end of the fuel filler pipe.

Since the first locking portion which projects in the direction of the inside diameter or radially inwards from the inner circumferential surface of the first tube is brought into engagement with the engagement hole in the fuel filler pipe from the outside, the portion where the first locking portion projects inwards of the fuel filler pipe from the inner circumference thereof can be eliminated or reduced, thereby making it possible to reduce the flowing resistance that fuel flowing through the interior of the fuel filler pipe has to meet.

According to a second aspect of the invention, there may be provided the fuel tank check valve, wherein the first locking portion has: a proximal end portion that is oriented towards an upstream direction and that is connected to a circumferential wall of the first tube; and a distal end portion that is oriented towards a downstream direction and that is separated from the circumferential wall of the first tube, and wherein the first locking portion is formed to rise from the inner circumferential surface of the first tube and to gradually project in the inside diameter direction.

According to the second aspect of the invention, since the proximal end portion of the first locking portion is oriented towards the upstream so as to be coupled to the circumferential wall of the first tube and the distal end portion thereof is oriented towards the downstream so as to be separated from the circumferential wall of the first tube to thereby project gradually radially inwards from the inner circumferential surface of the first tube, the first locking portion is made easy to deflect when the fuel filler pipe is inserted and the inserting resistance can be reduced. Then, when the first locking portion is brought into engagement with the engagement hole in the fuel filler pipe, an end face of the first locking portion confronts directly the front of the engagement hole for engagement therewith, whereby a high resistance against an attempt to pull out the fuel filler pipe from the check valve can be imparted to the fuel filler pipe, thereby strongly and rigidly coupling the fuel tank check valve to the fuel filler pipe.

According to a third aspect of the invention, there may be provided the fuel tank check valve, wherein the first locking portion is formed so that an outer end of the distal end portion is positioned radially outwards than the inner circumferential surface of the first tube.

According to the third aspect of the invention, when a pulling out force is applied to the fuel filler pipe, the first locking portion can be prevented from being broken to be damaged by the filler pipe being pulled out to hook on the outside diameter side of the first locking portion.

According to a fourth aspect of the invention, there may be provided the fuel tank check valve, wherein the first locking portion is formed so that a thickness of the proximal end portion is smaller than a thickness of the distal end portion, and wherein a downstream end face of the distal end portion is substantially at right angles to an axial direction of the first tube.

According to the fourth aspect of the invention, since the thickness of the proximal end portion is thinner than the thickness of the distal end portion, the first locking portion is made easy to deflect outwards, whereby the fuel filler pipe can be inserted into the check valve smoothly. In addition, since the distal end portion is thicker than the proximal end portion, the first locking portion can be brought into engagement with an inner circumferential surface of the engagement hole in the fuel filler pipe over a wide engagement area, thereby making it possible to obtain a high engagement force.

Further, since a downstream end face of the distal end portion of the first locking portion constitutes a vertical surface which is substantially at right angles to an axial direction of the first tube, when the fuel filler pipe is inserted into the main tubular body and the first locking portion deflects outwards, the downstream end face of the distal end portion of the first locking portion becomes skew relative to the axial direction of the first tube, whereby the distal end portion can be made thinner than when the distal end portion is brought into engagement with the engagement hole. As a result, the first locking portion does not interrupt the insertion of the fuel filler pipe when the filler pipe is attempted to be inserted, thereby ensuring the insertion of the fuel filler pipe.

According to a fifth aspect of the invention, there may be provided the fuel tank check valve, wherein the first locking portion is formed so that an outer circumferential surface of the proximal end portion is positioned radially inwards than an outer circumferential surface of the first tube.

According to the fifth aspect of the invention, since the outer circumferential surface of the proximal end portion of the first locking portion is formed further radially inwards than the outer circumferential surface of the first tube, a space for receiving the first locking portion being deflected radially outwards can be provided, and the first locking portion can be made easy to deflect outwards. In addition, since a radial-outward deflectable angle of the first locking portion can be set large, the first locking portion is surely prevented from interrupting the insertion of the fuel filler pipe.

BRIEF DESCRIPTION OF THE DRAWINGS

FIG. 2A is a sectional perspective view, and FIG. 2B is an enlarged sectional view.

FIG. 3A is a sectional perspective view, and FIG. 3B is an enlarged sectional view.

DETAILED DESCRIPTION OF THE EMBODIMENTS

Hereinafter, referring to FIGS. 1 to 4, a fuel tank check valve according to an embodiment of the invention will be described.

Figure 1:
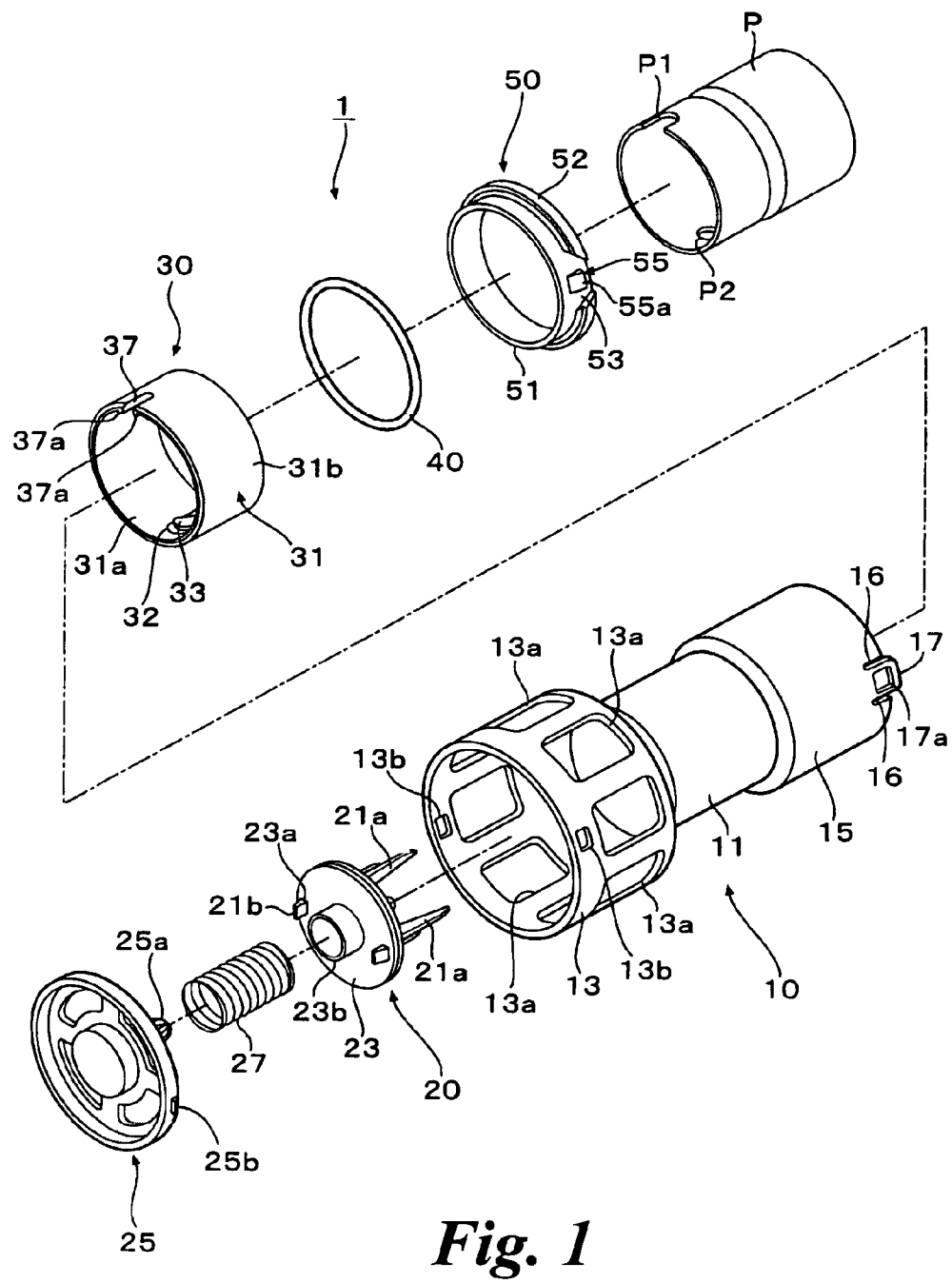
FIG. 1 is an exploded perspective view of a fuel tank check valve according to an embodiment of the invention.
Figure 4:
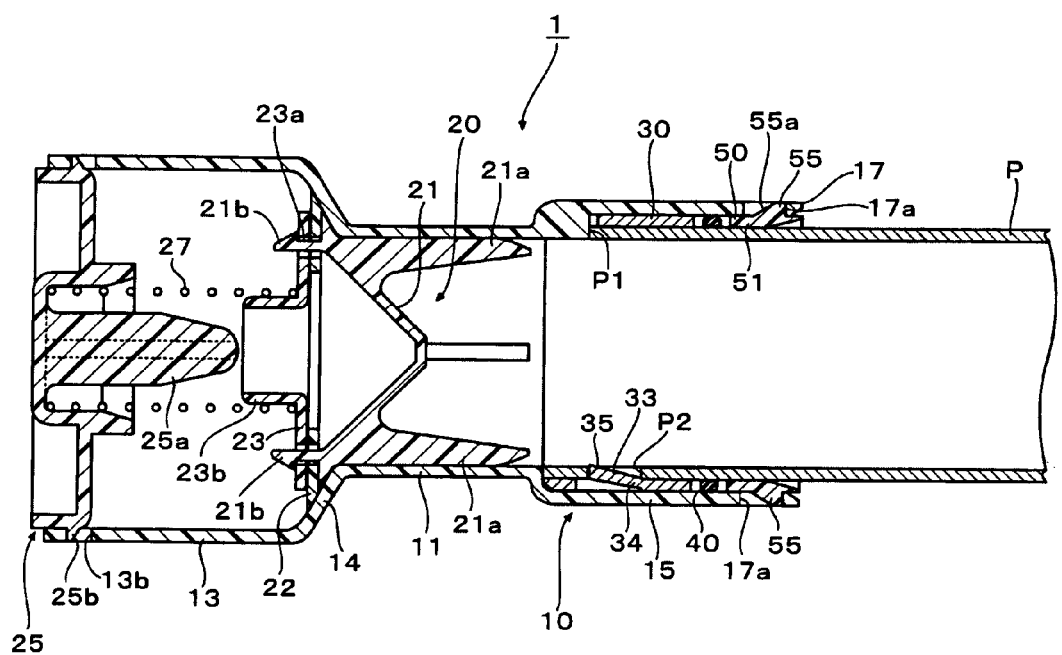
FIG. 4 is a sectional view of the fuel tank check valve.

As is shown in FIGS. 1, 4, a fuel tank check valve 1 (hereinafter, referred to as a "check valve 1") is provided on a downstream of a fuel filler pipe P (hereinafter, referred to as a "pipe P") of a fuel tank, not shown, and functions to permit flow of fuel that is poured into the pipe P from an upstream fuel supply port into the fuel tank and to prevent reverse flow of the fuel from the fuel tank to the pipe side. In the following description, an "upstream" and a "downstream" denote directions in which fuel flows. Specifically, a side of the pipe P on which the check valve 1 is provided is referred to as the downstream, and a side of the pipe P to which the fuel supply port is connected (an opposite side to the side where the check valve 1 is provided) is referred to as the upstream.

Figure 3A:
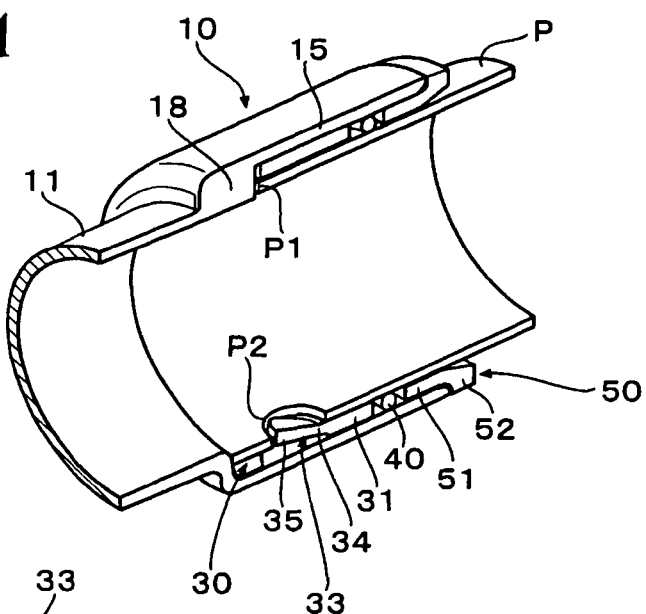
FIGS. 3A and 3B illustrate a state where the fuel tank check valve has been coupled to the fuel filler pipe.
Figure 3B:
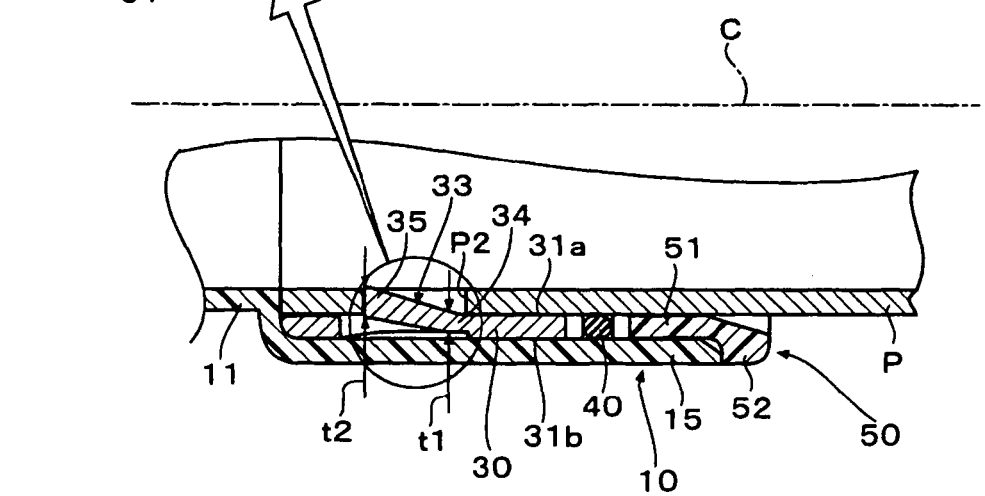

As is shown in FIGS. 3A and 3B, this check valve 1 is fitted on the pipe P and includes a main tubular body 10 which constitutes a fuel passage and a valve element 20 (refer to FIG. 1) which is provided at a downstream portion of the main tubular body 10 for permitting flow of fuel into the fuel tank.

As is shown in FIG. 1, the main tubular body 10 has a cylindrical-shaped diameter-reduced portion 11, a cylindrical-shaped outlet portion 13 which is coupled to a downstream end of the diameter-reduced portion 11 and which has a diameter larger than that of the diameter-reduced portion 11, and a cylindrical-shaped coupling portion 15 which is coupled to an upstream end of the diameter-reduced portion 11 and which has a diameter larger than that of the diameter-reduced portion 11. A plurality of openings 13a are formed in a circumferential wall of the outlet portion 13. As is shown in FIG. 4, a portion of the circumferential wall of the outlet portion 13 forms a valve seat 14 which lies to face the diameter-reduced portion 11. The valve seat 14 gradually expands towards a downstream and provides a valve seat function at an inner surface thereof.

In two opposed positions on a circumferential wall of the coupling portion 15, a pair of slits 16, 16 and an elastic engagement piece 17 therebetween are respectively formed. Locking holes 17a are formed in the elastic engagement pieces 17 so as to be respectively engaged with second locking portions 55 of a second tube 50, which will be described later. On an inner circumferential surface of a downstream of the coupling portion 15, a plate-like rotation restricting rib 18 is provided to project therefrom (refer to FIGS. 2A, 3A).

The valve element 20 is accommodated slidably inside the outlet portion 13. As is shown in FIGS. 1, 4, this valve element 20 has a valve main body 21, an elastic seal member 22 which is disposed on a rear surface of the valve main body 21 and is made to be connected to and disconnected from the valve seat 14 on its circumferential edge and a spring seat portion 23 which is attached to the valve main body 21 to sandwich the elastic seal member 22 with the valve main body 21. The valve main body 21 has a circular conical shape in which a center on an upstream surface rises. A plurality of guide projections 21a are provided on the valve main body 21 to axially extend from a circumferential edge thereof. Further, a plurality of locking legs 21b are provided on a downstream rear surface of the valve main body 21 to erect therefrom. The locking legs 21b are brought into engagement with holes 23a in the spring seat portion 23, so that the elastic seal member 22 is fixedly held by the valve main body 21 and the spring seat portion 23.

A cap 25 is attached to a downstream end of the outlet portion 13. A supporting projection 25a is provided at a center on an upstream surface of the cap 25 to erect therefrom. In addition, engaging projections 25b are provided on a circumferential portion of the cap 25 to project therefrom.

Then, the plurality of guide projections 21a are inserted inside the diameter-reduced portion 11, and an end of a coil spring 27 is fitted on a supporting tube 23b which is provided at a center of a rear surface of the spring seat portion 23 to be erect therefrom, while the other end of the coil spring 27 is fitted on the supporting projection 25a of the cap 25. In this state, by pushing in the cap 25 so that the engaging projections 25b on the cap 25 are brought into engagement with holes 13b which are formed in a downstream end edge of the outlet portion 13, the cap 25 is attached to the downstream end of the outlet portion 13 so that the valve element 20 is supported slidably.

In the state described above, the valve element 20 is urged towards the upstream by the coil spring 27, whereby the elastic seal member 22 is brought into abutment with the valve seat 14, whereby the fuel passage in the main tubular body 10 is closed. Then, when fuel is supplied into the pipe P from the fuel supply port, the valve element 20 moves towards the downstream against the urging force of the coil spring 27, whereby the elastic seal member 22 is disconnected from the valve seat 14, so that the fuel passage in the main tubular body 10 is opened.

As is shown in FIGS. 3A to 4, between the main tubular body 10 and the pipe P, a first tube 30, an annular seal member 40 and the second tube 50 are disposed. The first tube 30 has a first locking portion 33 for the pipe P. The annular seal member 40 is brought into abutment with circumferential surfaces of both the main tubular body 10 and the pipe P. The second tube 50 is disposed further upstream than the first tube 30 and has the second locking portion 55 for the main tubular body 10.

In this embodiment, the first tube 30 has a cylindrical-shaped circumferential wall 31 having an outside diameter which substantially matches an inside diameter of the coupling portion 15 of the main tubular body 10. The first locking portion 33 is formed to project in a direction of an inside diameter or radially inwards from an inner circumferential surface 31a of the circumferential wall 31 and to be brought into engagement with an engagement hole P2 in the pipe P which is to be disposed inside the first tube 30 (refer to FIGS. 3A to 4).

Figure 2A:
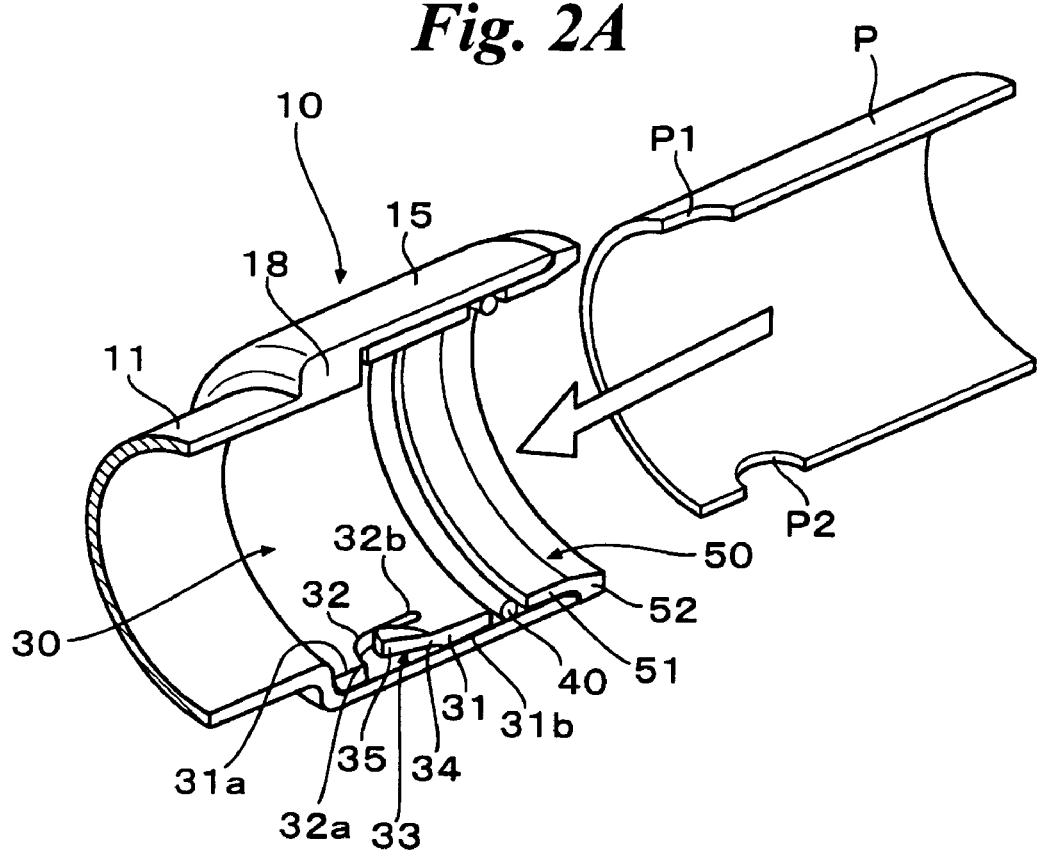
FIGS. 2A and 2B illustrate a state where the fuel tank check valve is being coupled to a fuel filler pipe.
Figure 2B:
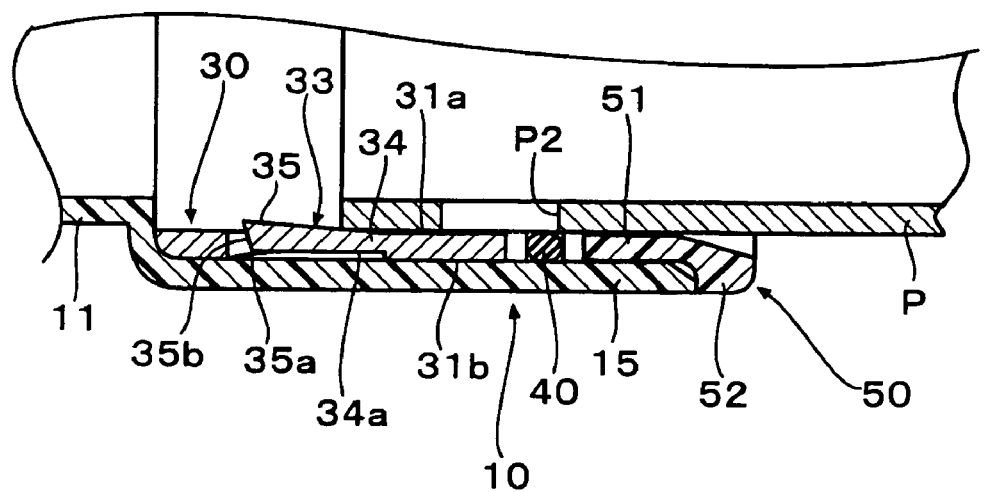

Referring to FIGS. 1 to 2B, as well, a substantially U-shaped slit 32 is formed on the cylindrical-shaped circumferential wall 31 of the first tube 30, and the first locking portion 33 is formed via the slit 32 to be deflectable. As is shown in FIG. 2A, the U-shaped slit 32 includes side grooves 32b, 32b and an arc-shaped portion 32a. The arc-shaped portion 32a is oriented towards the downstream, and the distal ends of the side grooves 32b, 32b are oriented towards the upstream. By the U-shaped slit 32, the first locking portion 33 is formed so that a proximal end portion 34 is oriented towards the upstream and coupled to the circumferential wall 31 and a distal end portion 35 is disconnected from the circumferential wall 31. That is, the first locking portion 33 is formed to project gradually radially inwards from the inner circumference of the first tube 30.

As shown in a partially enlarged view of FIG. 3B, an outer end portion 35a of the distal end portion 35 of the first locking portion 33 is situated further radially outwards than an inner circumferential surface 31a of the first tube 30. Similarly, as shown in FIG. 3B, in the first locking portion 33, a thickness t1 of the proximal end portion 34 is formed thinner than a thickness t2 of the distal end portion 35. A downstream end face 35b of the distal end portion 35 is substantially at right angles to an axial direction C of the first tube 30. Further, an outer circumferential surface 34a of the proximal end portion 34 is situated further radially inwards than an outer circumferential surface 31b of the circumferential wall 31 of the first tube 30 (refer to FIG. 3B).

As is shown in FIG. 1, in the circumferential wall of the first tube 30, a substantially U-shaped cutout groove 37 is formed in a position opposed to the first locking portion 33 to extend from the downstream end towards the upstream. And, on both side edge portions of the cutout groove 37, a pair of extended projections 37a, 37a are provided to project radially inwards of the first tube 30. The rotation restricting rib 18 of the main tubular body 10 fits in the cutout groove 37 (refer to FIGS. 2A, 3A) so as to restrict relative rotation between the main tubular body 10 and the first tube 30, and the pair of extended projections 37a, 37a fit in a rotation restricting groove P1 so as to restrict relative rotation between the first tube 30 and the pipe P.

The annular seal member 40 is made of rubber, elastomer or the like which is thicker than thicknesses of the first tube 30 and the second tube 50. When the pipe P is inserted into the second tube 50, the annular seal member 40 is made to be held by an inner circumference of the main tubular body 10 and an outer circumference of the pipe P so as to be brought into press contact with both the inner and outer circumferences, whereby sealing a gap between the main tubular body 10 and the pipe P.

The cylindrical-shaped second tube 50 has an outside diameter which substantially matches the inside diameter of the coupling portion 15 of the main tubular body 10 and has a circumferential wall 51 which is made shorter than the first tube 30. On an upstream outer circumference of the circumferential wall 51, a collar-like locking wall 52 is provided to project therefrom and to be locked on an upstream end face of the coupling portion 15 of the main tubular body 10. Insertion grooves 53, 53, which are cut out in a given width for receiving the corresponding elastic engagement pieces 17 of the main tubular body 10, are formed in circumferentially opposed positions on the collar-like locking wall 52. Each insertion groove 53 is made wider on a downstream and is made to be narrowed gradually in width towards an upstream thereof, so that the corresponding elastic engagement pieces 17 can be received easily therein.

On an outer circumferential surface 51 of the second tube 50, second locking portions 55, 55 are provided to be brought into engagement with the locking holes 17a in the main tubular body 10 in positions which are aligned with the insertion grooves 53, 53. An outer surface of each second locking portion 55 is made into a tapered surface 55a which slopes down gradually from an upstream towards a downstream thereof for easy engagement with the corresponding locking hole 17a.

While the check valve 1 of this embodiment employs the valve element 20 which slides in the axial direction of the main tubular body 10, as described in Japanese Patent No. 3886344, a so-called shutter type valve element in which a plate-like valve element is provided rotatably on a spindle provided at the downstream end of the main tubular body 10 for opening and closing the downstream opening of the main tubular body 10 may be adopted as the valve body. Thus, there is no specific limitation imposed on the type of a valve element.

Next, an exemplary function and advantage of the above-described check valve 1 will be described.

Firstly, as is shown in FIG. 1, the first tube 30 is inserted into the coupling portion 15 from the upstream end of the main tubular body 10, and the rotation restricting rib 18 (refer to FIGS. 2A, 3A) of the main tubular body 10 is fitted in the cutout groove 37 in the first tube 30, so that the first tube 30 is disposed in the main tubular body 10 while the relative rotation therebetween is restricted.

Thereafter, the annular seal member 40 and the second tube 50 are inserted sequentially into the main tubular body 10 from the upstream end thereof. As a result, as is shown in FIG. 2A, the second locking portions 55 are brought into engagement with the corresponding locking holes 17a in the elastic engagement pieces 17, and the collar-like locking wall 52 of the second tube 50 is made to be locked on the upstream end of the coupling portion 15, so that the second tube 50 is attached to the main tubular body 10 while the relative rotation therebetween is restricted.

Namely, the first tube 30, the annular seal member 40 and the second tube 50 are disposed on the inner circumference of the coupling portion 15 of the main tubular body 10 in advance, with the annular seal member 40 held between the first tube 30 and the second tube 50, and the second locking portions 55 of the second tube 50 are brought into engagement with the corresponding locking holes 17a in the main tubular body 10, whereby the annular seal member 40 can be held in the given position on the inner circumference of the coupling portion 15 of the main tubular body 10 (refer to FIG. 2A).

The downstream end of the pipe P is inserted into the second tube 50 from the upstream end of the main tubular body 10 in that state. Then, the downstream end of the pipe P passes through the second tube 50 and the annular seal member 40 and is then inserted into the first tube 30, whereby the proximal end portion 34 and the distal end portion 35 of the first locking portion 33 are pressed sequentially by the downstream end outer circumference of the pipe P, and the pipe P is then pushed into the main tubular body 10 while deflecting the first locking portion 33 radially outwards.

In this embodiment, as is shown in FIG. 2A, the first locking portion 33 is formed so that the upstream-positioned proximal end portion 34 is coupled to the circumferential wall 31 and the downstream-positioned distal end portion 35 is disconnected from the circumferential wall 31, that is, formed to project gradually radially inwards from the inner circumference of the first tube 30. As a result, the first locking portion 33 easily deflects when inserting the pipe P into the first tube 30, thereby reducing the inserting resistance.

In addition, in this embodiment, as is shown in FIG. 3B, since the thickness t1 of the proximal end portion 34 is formed thinner than the thickness t2 of the distal end portion 35, the first locking portion 33 easily deflects radially outwards, whereby the pipe P is inserted smoothly.

When no force is applied on the first locking portion 33, the downstream end face 35b of the distal end portion 35 is substantially at right angles to the axial direction C of the first tube 30. On the other hand, when the first locking portion 33 deflects radially outwards, the downstream end face 35b of the distal end portion 35 becomes askew relative to the axial direction C, as is shown in FIG. 2B. At this time, an effective thickness of the distal end portion 35 in a direction perpendicular to the axial direction C is made thinner than when the distal end portion 35 of the first locking portion 33 is brought into engagement with the engagement hole P2 of the pipe P so that a projecting amount of the downstream end face 35b of the first locking portion 33 from the inner circumferential surface 31a of the first tube 30 is suppressed, and the first locking portion 33 does not interrupt the insertion of the pipe P, whereby the pipe P can be surely inserted.

In addition, in this embodiment, as is shown in FIG. 3B, the outer circumferential surface 34a of the proximal end portion 34 of the first locking portion 33 is formed further radially inwards than the outer circumferential surface 31b of the circumferential wall 31 of the first tube 30. As a result, there is provided a space for receiving the first locking portion 33 being deflected radially outwards, whereby the first locking portion 33 easily deflects radially outwards. Further, since the radial-outward deflectable angle of the first locking portion 33 can be set large, the first locking portion 33 is surely prevented from interrupting the insertion of the pipe P.

Then, when the pipe P is pushed into the main tubular body 10 deeper while deflecting the first locking portion 33 radially outwards so that a downstream circumferential surface of the engagement hole P2 in the pipe P reaches the downstream end face 35b of the distal end portion 35 of the first locking portion 33, as is shown in FIGS. 3A, 3B, the first locking portion 33 is elastically restored so as to fit in the engagement hole P2 in the pipe P from the outside, whereby the downstream end face 35b of the distal end portion 35 of the first locking portion 33 is brought into engagement with the downstream circumferential surface of the engagement hole P2 in the pipe P. Namely, the first locking portion 33 of the first tube 30 is brought into engagement with the engagement hole P2 in the pipe P from the outside. Therefore, the pair of extended projections 37a, 37a (refer to FIG. 1), which projected from the rear side of the cutout groove 37 in the first tube 30, fit in the rotation restricting groove P1 in the pipe P, whereby the relative rotation between the first tube 30 and the pipe P is restricted.

As a result, in cooperation with the relative rotation restriction by the rotation restricting rib 18 and the cutout groove 37, the main tubular body 10 can be coupled to the pipe P while surely restricting the relative rotations between the main tubular body, the first tube 30 and the pipe P, whereby as is shown in FIG. 4, the check valve 1 can be mounted on the downstream end of the pipe P.

When fuel is poured from the upstream-positioned fuel supply port of the pipe P into the main tubular body 10 through the pipe P, the poured fuel comes to collide against a front surface of the valve element 20, causing the valve element 20 to move towards the downstream against the urging force of the coil spring 27, and the elastic seal member 22 is disconnected from the valve seat 14. Then, the fuel passage in the main tubular body 10 is opened, whereby the fuel is allowed to flow into the fuel tank, not shown, through the plurality of openings 13a in the outlet portion 13.

Then, in the check valve 1, since the first locking portion 33 of the first tube 30 is brought into engagement with the engagement hole P2 of the pipe P from the outside, the first locking portion 33 does not or hardly protrude exceeding the inner circumference of the pipe P. As a result, since almost no portion obstructing the passage of fuel exists in the pipe P, the flowing resistance for the fuel is reduced, whereby fuel is allowed to smoothly flow within the pipe P.

In addition, after the fuel tank is filled with fuel, the valve element 20 is pressed towards the upstream by the coil spring 27, and the elastic seal member 22 is brought into abutment with the valve seal 14 again, whereby the fuel passage in the main tubular body 10 is closed, and reverse flow of fuel from the fuel tank is prevented.

In addition, in this embodiment, the first locking portion 33 is formed to rise (refer to FIG. 2A), as is shown in FIGS. 3A, 3B. When the first locking portion 33 has been brought into engagement with the engagement hole P2 in the pipe P, the downstream end face 35b of the distal end portion 35 of the first locking portion 33 faces the downstream circumferential surface of the engagement hole P2. Because of this, for example, when the pipe P is pulled towards the upstream or the check valve 1 is pulled towards the downstream, the high pulling out resistance can be imparted, whereby the check valve 1 can be coupled to the pipe P strongly and rigidly.

Further, in this embodiment, as is shown in FIG. 3B, the outer end portion 35a of the distal end portion 35 of the first locking portion 33 is situated further radially outwards than the inner circumferential surface 31a of the first tube 30. As a result, when the pulling out force is applied to the pipe P, the pipe P is prevented from being hooked on the radially outer side of the first locking portion 33 to thereby break the first locking portion 33. If the first locking portion 33 is formed so that the outer end portion 35a of the distal end portion 35 is situated further radially inwards than the inner circumferential surface 31a of the first tube 30 (refer to an imaginary line in FIG. 3B), when the pulling out force is applied to the pipe P, the engagement hole P2 might be hooked on the radially outer side of the first locking portion 33 so as to roll up the first locking portion 33 and break it.

In addition, in this embodiment, as is shown in FIG. 3B, the first locking portion 33 is formed so that the thickness t2 of the distal end portion 35 is thicker than the thickness t1 of the proximal end portion 34. As a result, the distal end portion 35 of the first locking portion 33 can be brought into engagement with the engagement hole P2 of the pipe P over the wide engagement area, thereby enhancing the engagement force.

According to the above described embodiment, by disposing the first tube, the annular seal member and the second tube on the inner circumference of the main tubular body and by inserting the fuel filler pipe into the second tube from the upstream end of the main tubular body, the distal end of the fuel filler pipe sequentially passes through the second tube, the annular seal member and the first tube, and the first locking portion which projects radially inwards from the inner circumferential surface of the first tube is brought into engagement with the engagement hole in the fuel filler pipe from the outside, so that the fuel filler pipe is coupled to the main tubular body via the first tube, the annular seal member and the second tube, whereby the check valve can be mounted on the downstream end of the fuel filler pipe.

Since the first locking portion which projects radially inwards from the inner circumferential surface of the first tube is brought into engagement with the engagement hole in the fuel filler pipe from the outside, the first locking portion does not or hardly project into the inside of the fuel filler pipe from the inner circumference thereof, thereby reducing the flowing resistance against fuel.

What is claimed is:

1. A fuel tank check valve comprising:
    a main tubular body that is attached on a downstream end of a fuel filler pipe of a fuel tank;
    a valve element that is provided at a downstream portion of the main tubular body and that is configured to permit a fuel flowing into the fuel tank and prevent the fuel flowing out of the fuel tank;
    a first tube that is disposed between the main tubular body and the fuel filler pipe and that includes a first locking portion to engage with the fuel filler pipe;
    an annular seal member that is disposed to be brought into abutment with an inner circumferential surface of the main tubular body and an outer circumferential surface of the fuel filler pipe; and
    a second tube that is disposed upstream of the first tube so as to sandwich the annular seal member with the first tube and that includes a second locking portion to engage with the main tubular body,
    wherein the fuel filler pipe is disposed on an inner circumferential surface of the first tube,
    wherein the first locking portion projects from the inner circumferential surface of the first tube in an inside diameter direction,
    wherein the first locking portion is configured to engage with an engagement hole in the fuel filler pipe from an outside,
    wherein the first locking portion includes:
        a proximal end portion that is oriented towards an upstream direction and that is connected to a circumferential wall of the first tube; and
        a distal end portion that is oriented towards a downstream direction and that is separated from the circumferential wall of the first tube, and
    wherein the first locking portion is formed to rise from the inner circumferential surface of the first tube and to project in the inside diameter direction.

2. The fuel tank check valve according to claim 1, wherein the first tube comprises a U-shaped slit formed around the first locking portion.

3. A fuel tank check valve comprising:
    a main tubular body that is attached on a downstream end of a fuel filler pipe of a fuel tank;
    a valve element that is provided at a downstream portion of the main tubular body and that is configured to permit a fuel flowing into the fuel tank and prevent the fuel flowing out of the fuel tank;
    a first tube that is disposed between the main tubular body and the fuel filler pipe and that includes a first locking portion to engage with the fuel filler pipe;
    an annular seal member that is disposed to be brought into abutment with an inner circumferential surface of the main tubular body and an outer circumferential surface of the fuel filler pipe; and
    a second tube that is disposed upstream of the first tube so as to sandwich the annular seal member with the first tube and that includes a second locking portion to engage with the main tubular body,
    wherein the fuel filler pipe is disposed on an inner circumferential surface of the first Tube,
    wherein the first locking portion projects from the inner circumferential surface of the first tube in an inside diameter direction,
    wherein the first locking portion is configured to engage with an engagement hole in the fuel filler pipe from an outside,
    wherein the first locking portion includes:
        a proximal end portion that is oriented towards an upstream direction and that is connected to a circumferential wall of the first tube; and
        a distal end portion that is oriented towards a downstream direction and that is separated from the circumferential wall of the first tube, and wherein the first locking portion is formed to rise from the inner circumferential surface of the first tube and to gradually project in the inside diameter direction.

4. The fuel tank check valve according to claim 3, wherein the first locking portion is formed so that an outer end of the distal end portion is positioned radially outwards than the inner circumferential surface of the first tube.

5. The fuel tank check valve according to claim 3, wherein the first locking portion is formed so that a thickness of the proximal end portion is smaller than a thickness of the distal end portion, and wherein a downstream end face of the distal end portion is substantially at right angles to an axial direction of the first tube.

6. The fuel tank check valve according to claim 3, wherein the first locking portion is formed so that an outer circumferential surface of the proximal end portion is positioned radially inwards than an outer circumferential surface of the first tube.

7. The fuel tank check valve according to claim 3, wherein the first tube comprises a U-shaped slit formed around the first locking portion.

* * * * *